(No Model.)

J. E. HAINES.
SEEDING ATTACHMENT FOR VEHICLES.

No. 506,910. Patented Oct. 17, 1893.

WITNESSES:
P. F. Nagle.
L. Douville.

INVENTOR
Jacob E. Haines.
BY
[signature]
ATTORNEY.

UNITED STATES PATENT OFFICE.

JACOB E. HAINES, OF MEDFORD, NEW JERSEY.

SEEDING ATTACHMENT FOR VEHICLES.

SPECIFICATION forming part of Letters Patent No. 506,910, dated October 17, 1893.

Application filed June 8, 1893. Serial No. 476,902. (No model.)

*To all whom it may concern:*

Be it known that I, JACOB E. HAINES, a citizen of the United States, residing at Medford, in the county of Burlington, State of New Jersey, have invented a new and useful Improvement in Seeding Attachments for Vehicles, which improvement is fully set forth in the following specification and accompanying drawings.

My invention consists of a seeding attachment which may be readily connected with a light wagon, cart or other ordinary vehicle, and removed therefrom when desired, without affecting the construction or utility of the vehicle, said attachment being simple, inexpensive and effective, and may be quickly placed in and out of service.

Figure 1:
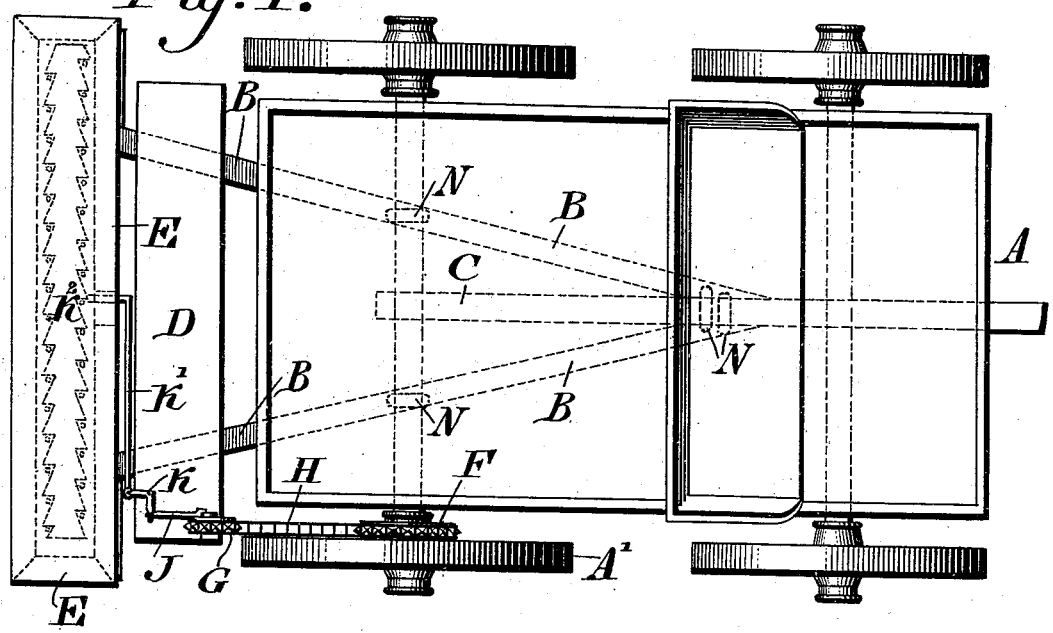
Figure 2:
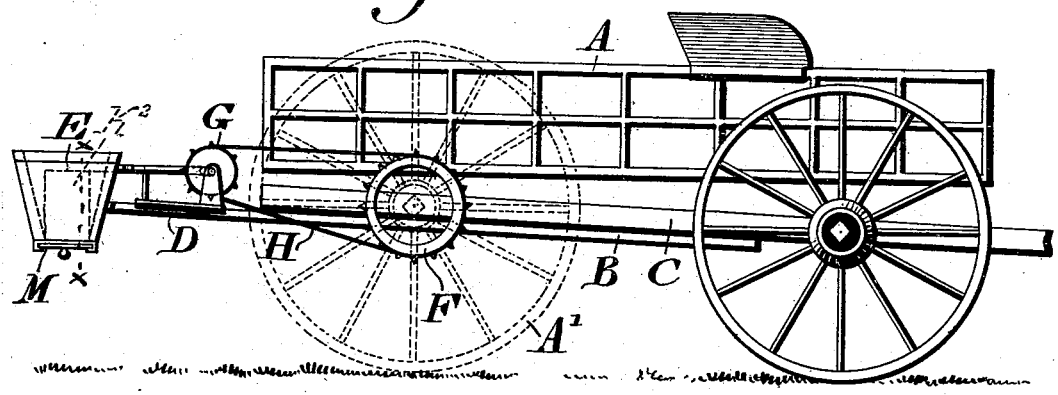
Figure 3:
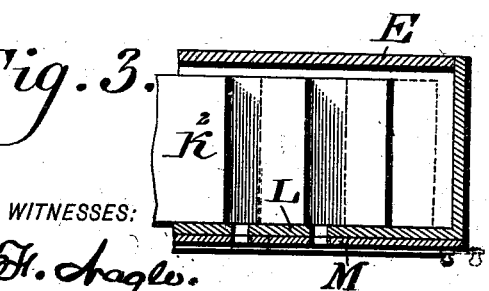
Figure 4:
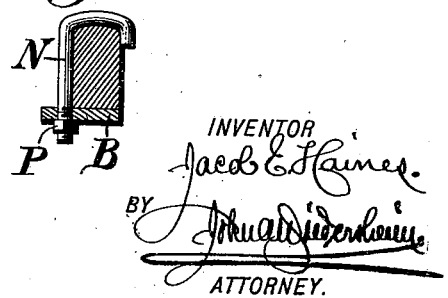

Figure 1 represents a top or plan view of a seeding attachment embodying my invention, including a vehicle with which it is connected. Fig. 2 represents a side elevation thereof. Fig. 3 represents a section of a portion on line $x, x$, Fig. 2, on an enlarged scale. Fig. 4 represents a partial section and partial side elevation of the fastening device of portions of the attachment.

Similar letters of reference indicate corresponding parts in the several figures.

Referring to the drawings: A designates a light wagon or road cart, which excepting the features of my invention applied thereto is of usual construction.

B, B, designate two beams which are connected with the perch C, and converge therefrom and support at their rear ends the platform and step D, and seed box E.

To one of the wheels A' of the vehicle is secured the sprocket wheel F, and mounted on the platform D is a sprocket wheel G. Passing around said wheels F and G is a sprocket chain H, whereby motion of the wheel A' may be communicated to the wheel G, the latter acting as a crank wheel, and having connected with it the rod J, which is freely attached to one limb of the elbow K, whose bearings are on the platform D, the other limb of said elbow being connected by means of a rod K' with the shuffle or agitator $K^2$ of the seed box E. The bottom of said box is perforated and provided with a graduated bottom L, and a cut-off slide M, the sides of the shuffle or agitator being serrated or otherwise recessed, so as to agitate the seed and permit the same to reach the bottom of the box.

In order to connect the beams B with the perch and rear axle, I employ hooks N, which engage with the perch and axle, and their shanks pass through openings in the beams and are provided with nuts P, whereby the hooks may be tightened in position, and the beams accordingly firmly connected with the vehicle.

The sprocket wheel F may be connected with the wheel A' by means of said hooks N, the latter passing through the rim of the sprocket wheel, and engaging with the sprockets of the wheel A', are tightened by the nuts on the shanks of said hooks.

It will be seen that when the discharge openings of the seed box are adjusted, and the box supplied with seed, the vehicle is propelled, whereby motion is imparted to the sprocket wheel F, the chain H, and sprocket wheel G, and consequently to the shuffle or agitator $K^2$ through the intermediate mechanism J, K, and K'.

When the seeding attachment is not required, the nuts are unscrewed, and the hooks removed, whereby the beams B are disconnected from the perch and axle. The sprocket chain H is also removed from the wheel G, and its links may be separated the sprocket wheel F being also unhooked from the wheel A', and thus the attachment is entirely independent of the vehicle and it may be stored away or otherwise disposed of, while the vehicle is left intact.

It is evident that by restoring the wheel F, connecting the beams B with the vehicle and applying the chain H, the seeding attachment is placed in condition for operation.

Having thus described my invention, what I claim as new, and desire to secure by Letters Patent, is—

1. Beams having means substantially as described for detachably connecting the same with the perch and rear axle of a wagon, a platform and a seed box with an agitator therein supported on said beams, a sprocket wheel on the wagon axle, a sprocket wheel mounted on the said platform, a chain connecting said sprocket wheels, and means connected with the sprocket wheels and agitator for operating the latter, said parts being combined substantially as described.

2. Converging beams detachably connected with the perch and an axle of a wagon a platform, and a seed box supported on said beams, a sprocket wheel on the axle of the said wagon, and a sprocket wheel mounted on the said platform, a chain for said sprocket wheels a rod eccentrically connected with one of said sprocket wheels, and to an elbow lever pivoted on said platform, and a rod connecting said elbow lever with an agitator in the seed box, said parts being combined substantially as described.

3. A seeding attachment for a wagon, consisting of a seed box, a platform and a support for said box and platform, said support being detachably connected with the perch and axle of the wagon, and said platform having thereon a sprocket wheel connected by a chain with a sprocket wheel on the said axle, and mechanism substantially as described connected with one of said sprocket wheels and the agitator of the seed box for operating said agitator, said parts being combined substantially as described.

JACOB E. HAINES.

Witnesses:
JOHN A. WIEDERSHEIM,
A. P. JENNINGS.